US008559025B2

(12) United States Patent
Shimada (10) Patent No.: US 8,559,025 B2
(45) Date of Patent: Oct. 15, 2013

(54) SCANNER, READING SYSTEM, AND COMPUTER PROGRAM THAT SEQUENTIALLY SUPPLIES IMAGE DATA TO AN EXTERNAL DEVICE

(75) Inventor: Yusuke Shimada, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 790 days.

(21) Appl. No.: 12/716,546

(22) Filed: Mar. 3, 2010

(65) Prior Publication Data
US 2010/0245932 A1 Sep. 30, 2010

(30) Foreign Application Priority Data
Mar. 24, 2009 (JP) ................................. 2009-072209

(51) Int. Cl.
 *G06F 3/12* (2006.01)
(52) U.S. Cl.
 USPC .......... 358/1.13; 358/505; 358/405; 358/449; 358/450; 709/232
(58) Field of Classification Search
 USPC ........... 358/505, 524, 405, 449, 450; 709/232
 See application file for complete search history.

(56) References Cited

U.S. PATENT DOCUMENTS

| 6,493,105 B1 * | 12/2002 | Onuma ........................ 358/1.15 |
| 2002/0048040 A1 | 4/2002 | Kato | |
| 2004/0046972 A1 | 3/2004 | Shibao | |
| 2006/0200529 A1 * | 9/2006 | Tonegawa ...................... 709/206 |
| 2006/0212528 A1 * | 9/2006 | Tonegawa ...................... 709/206 |

FOREIGN PATENT DOCUMENTS

| JP | 11-161568 | 6/1999 |
| JP | 2002-290654 A | 10/2002 |
| JP | 2004-147294 A | 10/2002 |
| JP | 2006-285516 | 10/2006 |
| JP | 2007-19750 | 1/2007 |

OTHER PUBLICATIONS

Notification of Reason for Refusal mailed Nov. 30, 2010 in corresponding Japanese Patent Application No. 2009-072209, together with English language translation.

* cited by examiner

*Primary Examiner* — King Poon
*Assistant Examiner* — Jamares Q Washington
(74) *Attorney, Agent, or Firm* — Scully, Scott, Murphy & Presser, PC (57) ABSTRACT

A scanner connected to an external device through a network is provided. The scanner includes, a reading section that reads an image recorded on a sheet so as to generate image data, an image data group supply section that, in a case where a plurality of images recorded on a plurality of sheets are read by the reading section, sequentially generates an image data group every time a part of the plurality of sheets is read by the reading section, and sequentially supplies the generated image data group to the external device, a joint information generation section that generates joint information used to join two or more of the image data groups, the two or more of the image data groups representing the plurality of images; and a joint information supply section that supplies the joint information to the external device.

12 Claims, 6 Drawing Sheets

| DOCUMENT SIZE | NUMBER OF SETS OF COLOR DATA (MONOCHROME OR COLOR) | RESOLUTION | MAXIMUM NUMBER OF PAGES (UNIT NUMBER OF TRANSMISSION SHEETS) |
|---|---|---|---|
| A5 | MONOCHROME | 300 | 120 |
| A5 | MONOCHROME | 600 | 60 |
| A5 | MONOCHROME | 1200 | 30 |
| A5 | COLOR | 300 | 40 |
| A5 | COLOR | 600 | 20 |
| A5 | COLOR | 1200 | 10 |
| A4 | MONOCHROME | 300 | 60 |
| A4 | MONOCHROME | 600 | 30 |
| A4 | MONOCHROME | 1200 | 15 |
| A4 | COLOR | 300 | 20 |
| A4 | COLOR | 600 | 10 |
| A4 | COLOR | 1200 | 5 |
| A3 | MONOCHROME | 300 | 30 |
| A3 | MONOCHROME | 600 | 15 |
| A3 | MONOCHROME | 1200 | 7 |
| A3 | COLOR | 300 | 10 |
| A3 | COLOR | 600 | 5 |
| A3 | COLOR | 1200 | 2 |
| B5 | MONOCHROME | 300 | 105 |
| B5 | MONOCHROME | 600 | 52 |
| B5 | MONOCHROME | 1200 | 26 |
| B5 | COLOR | 300 | 35 |
| B5 | COLOR | 600 | 17 |
| B5 | COLOR | 1200 | 8 |
| B4 | MONOCHROME | 300 | 52 |
| B4 | MONOCHROME | 600 | 26 |
| B4 | MONOCHROME | 1200 | 35 |
| B4 | COLOR | 300 | 17 |
| B4 | COLOR | 600 | 8 |
| B4 | COLOR | 1200 | 4 |

SCANNER, READING SYSTEM, AND COMPUTER PROGRAM THAT SEQUENTIALLY SUPPLIES IMAGE DATA TO AN EXTERNAL DEVICE

CROSS-REFERENCE TO RELATED APPLICATIONS

The present application claims priority from Japanese Patent Application No. 2009-072209, which was filed on Mar. 24, 2009, the disclosure of which is herein incorporated by reference in its entirety.

TECHNICAL FIELD

The present invention relates to a scanner connected to an external device by way of a network.

BACKGROUND

There has been available a technique for supplying an external device with image data, which is acquired by reading a sheet with a scanner, by way of a network.

A related-art scanner usually reads a plurality of sheets, subsequently generates a file showing all of a plurality of images recorded on the plurality of sheets, and supplies an external device with the thus-generated file.

However, when the number of sheets is large, difficulty is encountered in generating a file from a plurality of sets of image data corresponding to the plurality of sheets. Consequently, a situation where a file cannot be supplied to the external device arises. This is attributable to the fact that, when the number of sheets is large, not all of the plurality of sets of image data can be stored because of a comparatively small amount of memory space being available in the scanner.

Meanwhile, a technique that enables a facsimile to transmit image data to a terminal unit (PC) by way of a connector cable and further enables the terminal unit to transmit a file generated by use of the image data to an arbitrary transmission destination is known.

SUMMARY

Meanwhile, even when the number of sheets is large as mentioned above, another technique for supplying an external device with a file has been sought.

Accordingly, an exemplary embodiment of the present invention may make it possible to supply an external device with a file even when the number of sheets is large; in other words, when memory space for storing the image data is not sufficient.

According to an illustrative aspect of the invention, there is provided a scanner connected to an external device through a network, comprising: a reading section that reads an image recorded on a sheet so as to generate image data, an image data group supply section that, in a case where a plurality of images recorded on a plurality of sheets are read by the reading section, sequentially generates an image data group every time n (n>=1) number of sheet among the plurality of sheets is read by the reading section, and sequentially supplies the generated image data group to the external device, each image data group including n number of image data corresponding to the n number of sheet, and n number of sheet being a part of the plurality of sheets, a joint information generation section that generates joint information used to join two or more of the image data groups, the two or more of the image data groups representing the plurality of images, and a joint information supply section that supplies the joint information to the external device.

DESCRIPTION

An exemplary embodiment of the present invention is now described by reference to the drawings.

(1) Overall Configuration

Figure 1:
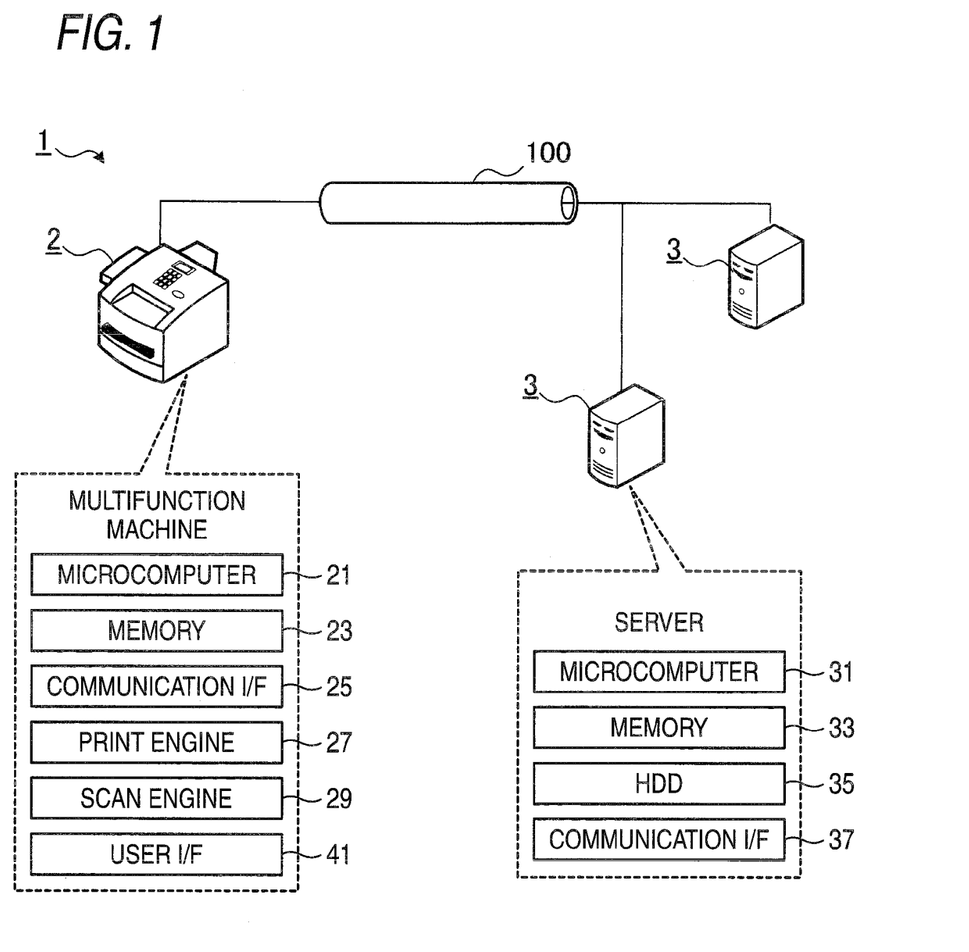
FIG. 1 is a block diagram showing an overall configuration of a reading system.

A reading system 1 is configured in such a way that a multifunction machine 2 and one or more servers 3 are in communication with each other, as shown in FIG. 1.

The multifunction machine 2 has a microcomputer 21, memory 23, a communication interface (communication I/F) 25, a print engine 27, a scanner engine 29, and a user interface (user I/F) 41. The multifunction machine 2 has a function of reading an image on a sheet (including a sheet-like recording medium other than paper) by means of the scanner engine 29 when a scan job command is received from a client (not shown) connected by way of a network 100 or when a scan job start operation is performed by way of a user I/F 41, to thus generate image data, and supplying the servers 3 with the thus-generated image data.

Each of the servers 3 has a microcomputer 31, memory 33, a hard disk drive (HDD) 35, and a communication interface (a communication I/F) 37 and works as a file server that stores image data received from the multifunction machine 2 into the hard disk drive 35. The image data stored in the sever 3 is managed by way of a management computer (not shown) connected to the server 3 so as to communicate by way of the network 100.

(2) First Scan Processing Performed by the Multifunction Machine 2

Processing procedures of first scan processing executed by the microcomputer 21 of the multifunction machine 2 in accordance with a program stored in the memory 23 are described by reference to FIG. 2. When a first scan processing program is set as a scan function program, first scan processing is started when the scan job command from a client or scan job start operation by way of the user I/F 41 is received.

In the present embodiment, the scan job command from the client is additionally provided with identification information about a user who attempts to utilize the scan function of the multifunction machine 2. Additionally, operations for starting scan job input by way of the user I/F 41 includes an operation for inputting identification information about the user who attempts to utilize the scan function of the multifunction machine 2. Prior to initiation of first scan processing, identification information about a user (hereinafter called "user information") is acquired.

When first scan processing is started, a number which will become a maximum page number of image data to be included in an image data group through processing described later (hereinafter called a "maximum number of pages") is determined from a data parameter (s110).

The "data parameter" is set as a parameter used when the scan engine 29 reads an image. The data parameter includes; for instance, the size of a sheet (a document size) (e.g., an A4 size, a B4 size, and the like), the number of sets of color data [e.g., "three" for color data (i.e., R, G, B data), "one" for monochrome data (i.e., Y data)], a resolution (e.g., 600 dpi× 600 dpi, 1200 dpi×1200 dpi, etc.), and the like, employed during reading operation.

In s110, the number of sets of image data to be stored in the memory 23 is specified with reference to a volume of image data (a presumed volume of data) which will be generated when an image is read based on a preset data parameter, and the thus-specified number is determined to be a "maximum number of pages." Specifically, a small number is determined as a maximum number of pages as the size of a sheet, the number of sets of color data, and a resolution value become greater.

Figure 3:
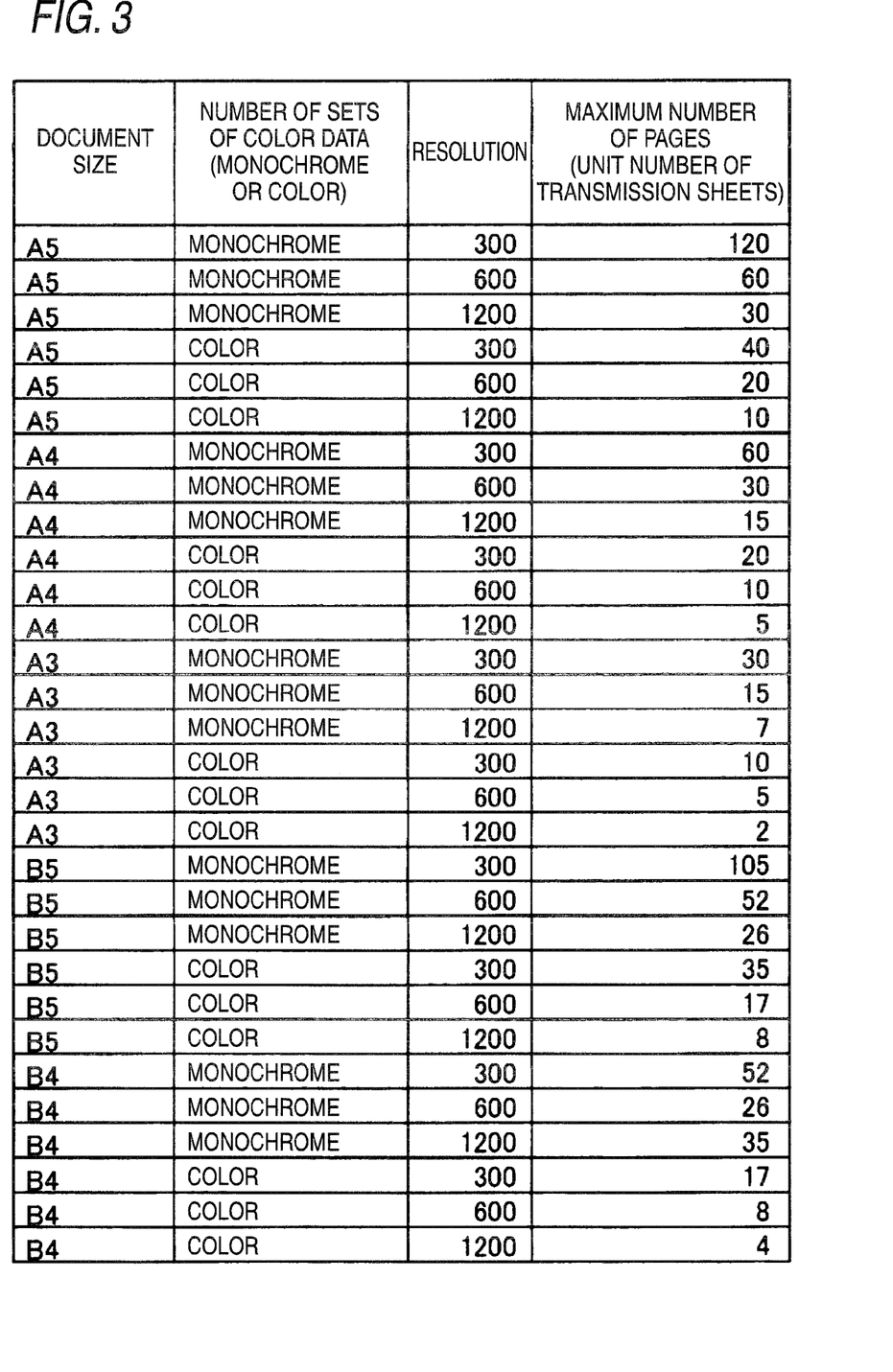
FIG. 3 shows data structure of a data table.

In the present embodiment, by referring to the data table (FIG. 3) in which combinations of data parameters and the maximum number of pages (a unit transmission number) to be included in the image data group are brought into correspondence with each other and registered, the maximum number of pages corresponding to the preset data parameters is determined. A data table shown in FIG. 3 exemplifies "monochrome" data whose color data number is one and "color" data whose color data number is three. A resolution in the data table shows the number of pixels acquired per unit area (dpi×dpi). In FIG. 3, the number of pixels per unit area is represented in an abbreviated manner by means of the number of pixels acquired per inch (dpi).

Next, the top sheet of one or more sheets stacked in an original housing unit of the multifunction machine 2 is subjected to reading (s120). When the sheet is read, image data representing the image recorded on the sheet is generated in the form of a bitmap or RAW format. The sheet subjected to reading is output by way of a predetermined sheet output path, and the next sheet in the stack comes to the top.

Next, the image data generated in s120 are stored in the memory 23, and the number of cumulative pages stored in the memory 23 is updated (s130). The number of cumulative pages is set to an initial value "0" when the first scan processing begins, and the number of cumulative pages is incremented by one every time processing according to s130 is performed.

Next, the memory 23 is checked to determine whether or not the number of cumulative pages stored has reached the maximum number of pages (s140).

When the number of cumulative pages of image data is determined not to have reached the maximum number of pages in s140 (NO in S140), the multifunction unit 2 checks whether or not reading of all sheets has been completed (s150).

When reading of all sheets is determined not to have finished in s150 (NO in s150), processing returns to s120. The processing according to s120 and the subsequent steps is repeated for the next sheet.

When reading of all sheets is determined not to have finished in s150 (NO in 150), image data is stored in the memory 23 and the value of the number of cumulative pages is updated (s130) until image data equivalent to the maximum number of pages has been generated (s140).

During the repetition of processing according to s120 to s150, when the number of cumulative pages of image data is subsequently determined to have reached the maximum number of pages in s140 (YES in s140), or when reading of all sheets is determined to have finished in s150 (YES in s150), image information about the image data group stored in the memory 23 is generated and stored in the memory 23 (s160).

The image information includes information showing a data group name for identifying an image data group and the volume of data in an image data group. In the present embodiment, as will be described later in connection with s170 and s190, an image data group including one or more sets of image data is taken as one file. Therefore, one data group name (one file name) is utilized as information for identifying one image data group. However, when one or more sets of image data included in the image data group are individually handled instead, a data name identifying each set of image date can be utilized in place of the data group name.

Next, the image data group stored in the memory 23 is supplied to each of the servers 3 (s170). At this point in time, the image data group and user information are now transmitted to the server 3 identified by the user, who is utilizing the multifunction machine 2; that is, the server 3, which the user identified with the user information acquired before initiation of scan processing, is allowed to utilize the image data group. Then, the transmitted image data group is deleted from the memory 23 and the number of cumulative pages is reset to zero in s170.

As is evident from the foregoing descriptions, the "number of cumulative pages" is a parameter for determining whether or not the number of sets of image data making up one image data group has reached the maximum number of pages.

The server 3 stores the image data group received from the multifunction machine 2 in a user memory area of the hard disk drive 35. The user memory area is specified by the user information transmitted with the image data.

Next, the multifunction unit 2 checks whether or not reading of all of the sheets has finished (s180).

When reading of all sheets is determined not to have finished in s180 (NO in s180), processing returns to s120 and the processing according to s120 and the subsequent steps is repeated for the remaining sheets.

In subsequent steps, image data groups including image data equal in number to the maximum number of pages are sequentially supplied to the server every time image data equal in number to the maximum number of pages is generated (YES in s140) (s170) (see "Send_Data" in FIG. 4A) until reading of all sheets is completed.

During the repetition of processing according to s120 to s180, when all of the sheets are determined to have finished being read in s180 (YES in s180), joint information used to join a plurality of image data groups previously supplied to the server 3 is generated, and the joint information is supplied to the server 3 (s190).

The joint information includes a joint algorithm for joining a plurality of image data groups to generate a single file, a plurality of pieces of image information corresponding to a plurality of image data groups transmitted to the server 3, and a file name to be appended to the single file achieved after a joining operation. The joint information is transmitted to the server 3, which has a memory area for the user, who is now utilizing the multifunction machine 2, was previously done in s170 (see "joint information transmission" in FIG. 4A).

A joint algorithm included in the joint information is, for example, an algorithm required to translate image data of a bitmap or RAW format into a single file (e.g., a PDF file) having a data format usable in a predetermined application.

Meanwhile, a file name designated by the user, a file name generated by the multifunction machine 2 in compliance with a predetermined rule (e.g., a file name utilizing a date and time when first scan processing is started), or the like, can be utilized as the file name to be appended to a single file achieved after joining operation.

Figure 4:
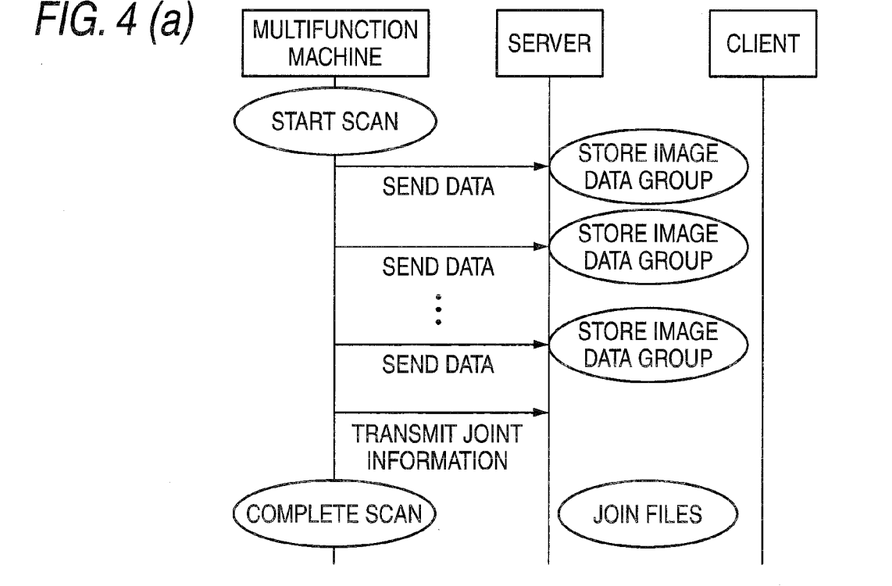
FIG. 4 is a sequence diagram showing a flow of data during the first scan processing.

When the server 3 receives the joint information from the multifunction machine 2, the server 3 identifies a plurality of image data groups, among a plurality of image data groups stored in the hard disk drive 35, by using a plurality of pieces of image information included in the joint information and the server joins the plurality of thus-identified image data groups (the plurality of files) into a single file pursuant to an algorithm included in the joint information (see "file joint" in FIG. 4A). A file name is appended to a file achieved through the joining operation in accordance with the file name included in the joint information.

In FIG. 4A, the server 3 joins the image data groups in accordance with the joint information immediately after receipt of the joint information. However, as shown in FIG. 4B, the server 3 can store the joint information in the hard disk drive 35 of the server 3, send an acknowledgement (see "completion acknowledgement" shown in FIG. 4B) to a client that has issued a scan job command, and join image data groups when the joint command is received from the client (see a "joint command" in FIG. 4B) instead. The thus-joined file can be browsed or read by a client (see "browsing and reading" in FIG. 4B). Another terminal unit that has read the image data group and the joint information from the server 3 can also join image data groups.

First scan processing is completed after processing pertaining to s190 has thus been performed.

(3) Second Scan Processing Performed by the Multifunction Machine 2

Processing procedures of second scan processing performed by the microcomputer 21 of the multifunction machine 2 in compliance with a program stored in the memory 23 are described by reference to FIG. 5. Second scan processing is commenced in response to receipt of a scan job command or operation for starting a scan job when a second scan processing program is set as a program for a scan function.

Second scan processing differs from first scan processing only in part. Therefore processing operations of the second scan processing identical with those of first scan processing are assigned the same step numbers, and their duplicate explanations are omitted.

When second scan processing is started, first, an operation mode flag is cleared (zero is set on the flag) (s100).

The operation mode flag shows which one of the first operation mode and the second operation mode is selected. When the flag is set to zero, the second operation mode is selected. On the contrary, when the flag is set to one, the first operation mode is selected. Namely, the second operation mode is selected as the operation mode in s100.

The "first operation mode" is an operation mode in which an image data group is sequentially supplied to the server 3 every time some of a plurality of sheets are read, as in the case with first scan processing. On the contrary, the "second operation mode" is an operation mode in which all sets of image data acquired as a result of all sheets being read are collectively supplied to the server 3. Specifically, the "second operation mode" is an operation mode in which a joined file, which is formed by joining all sets of image data acquired by reading all sheets, is supplied to the server 3.

A sheet is next read (s120), and image data and the number of cumulative pages are stored in the memory 23 (s130).

Next, the memory 23 is checked to determine whether or not space sufficient for storing image data still exists as memory space (s240). The phrase "sufficient remaining memory space" means a presumed volume of data or more as mentioned previously.

When sufficient remaining memory space is determined to still exist in s240 (YES in s240), the multifunction machine 2 checks whether or not reading of all sheets is completed (s310).

When reading of all sheets is determined not to have finished in s310 (NO in s310), processing returns to s120, and the processing according to s120 and the subsequent steps is repeated for the next sheet.

Once reading of all sheets is determined to have finished in s310 (YES in s310), it is determined whether or not the first operation mode is selected as an operation mode (s320). When an operation mode flag is set in s250 to be described later (namely, the flag is set to "one"), the first operation mode is determined to have been selected in s320. When the operation mode flag is cleared in s110 (namely, the flag is set to zero), the second operation mode is determined to have been selected.

When the first operation mode is determined not to have been selected in s320; namely, when the second operation mode is determined to have been selected (NO in s320), the image data groups stored in the memory 23 thus far during the iterative processing are converted into a single file by the multifunction machine 2 (s330) and the single file is supplied to the server 3 (s340). After the single file is supplied to the server 3 (s340), second scan processing is completed.

When the first operation mode is determined to have been selected in s320 (YES in s320), image information about the image data groups stored in the memory 23 thus far during the iterative processing is generated, and the image information is stored in the memory 23 (s360), and subsequently, the image data groups stored in the memory 23 at this point in time are subsequently supplied to the server 3 (s370).

Joint information used to join the plurality of image data groups supplied to the server 3 thus far is generated, and the generated joint information is supplied to the server 3 (s190), whereupon second scan processing ends.

When sufficient remaining memory space is determined not to exist in the memory 23 in s240 (NO in s240), the operation mode flag is set (the flag is set to one) (s250) the first operation mode is selected as a result of setting of the operation mode flag.

Image information about the image data groups stored in the memory 23 at this point in time is now generated and stored in the memory 23 (s160). After the image data groups have been supplied to the server 3 (s170), the multifunction device checks whether or not reading of all sheets is completed (s180).

When reading of all sheets is determined to have not finished in s180 (NO in s180), processing returns to s120, and processing according to s120 and the subsequent steps is repeated for the remaining sheets.

Conversely, when reading of all sheets is determined to have finished in s180 (YES in s180), processing proceeds to s190, where joint information for joining the image data groups supplied to the server 3 thus far is generated. Second scan processing ends after the joint information has been supplied to the server 3 (s190).

During second scan processing configured as mentioned above, the operation mode flag is cleared in s100 initially, and the operation mode is turns to the second operation mode.

Reading a sheet (s120) and storing image data and storing the number of cumulative pages (s130) is repeated during a period in which sufficient remaining memory space exists in the memory 23 (YES in s240) or before reading of all sheets is completed (NO in s310). Image data is sequentially accumulated in the memory 23 by means of the repeated processing according to s130.

When reading of all sheets is subsequently completed while sufficient remaining memory space exists in the memory 23 (YES in s240 to YES in s110) it is determined whether or not the first operation mode is selected (s320).

During processing described thus far, reading of all sheets is completed (YES in s310) when sufficient remaining memory space still exists in the memory 23; namely, when YES is determined in s240, after the second operation mode is selected as a result of the operation mode flag being cleared in s100 (zero is set), reading of all sheets is completed (YES in s310). Therefore, processing according to s250, i.e. processing which would proceed if NO is selected in s240, is not yet performed. Additionally, setting of the operation mode flag in s250 (setting of "one"), i.e., selection of the first operation mode, is not yet selected.

The first operation mode is then determined not to have been selected in s320; in other words, the second operation mode is determined to be selected (NO in s320). As a consequence, second scan processing ends after the image data groups are converted into a single file (s330) and the single file is supplied to the server 3 (s340).

Figure 5:
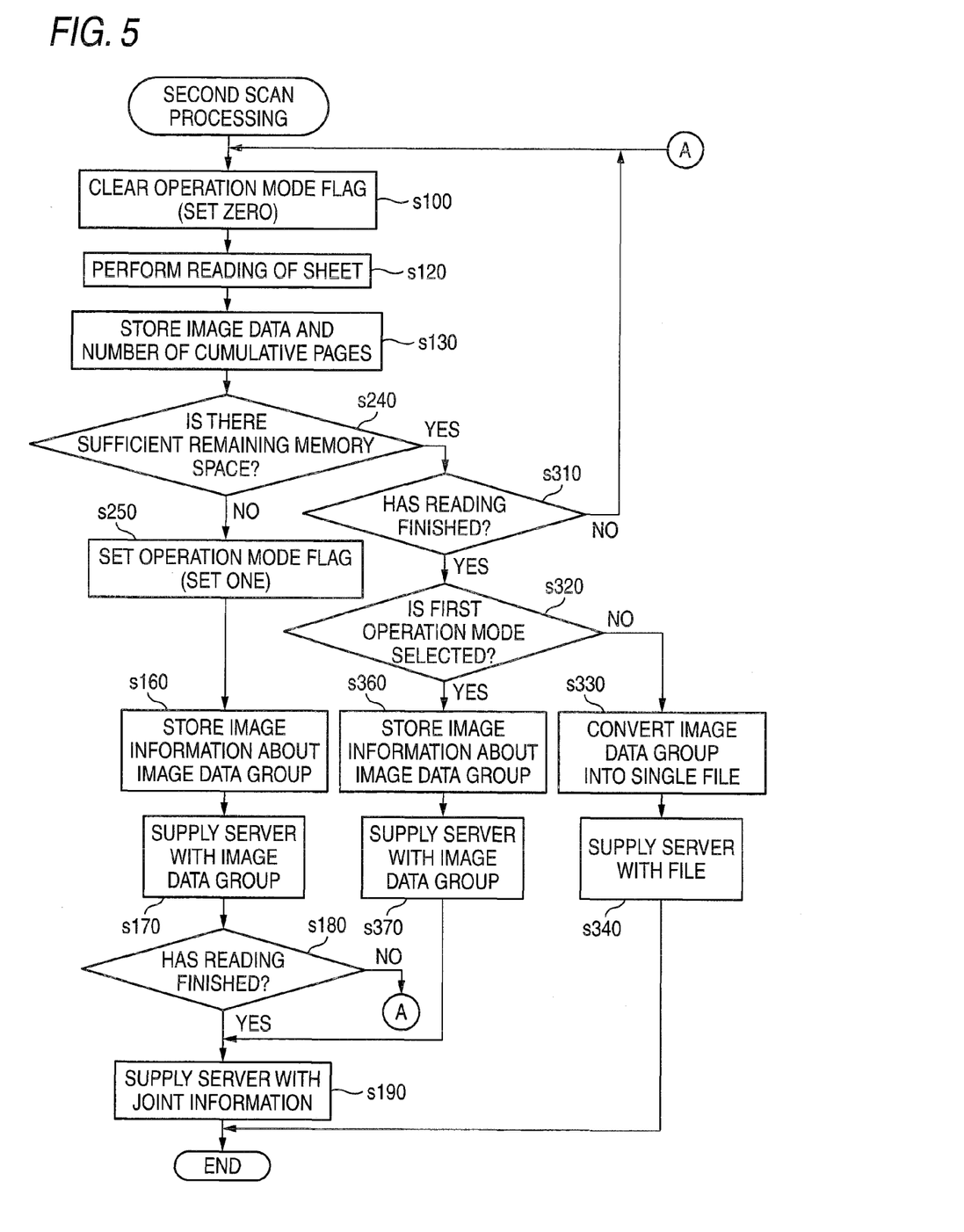
FIG. 5 is a flowchart showing a second scan processing.
Figure 6:
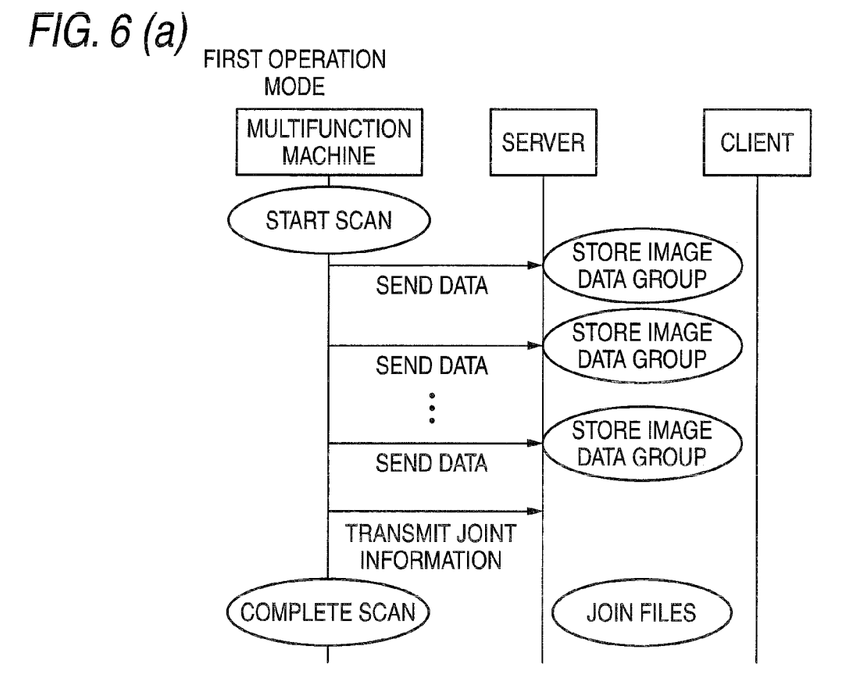
FIG. 6 is a sequence diagram showing a flow of data during the second scan processing.

As described thus far, if sufficient remaining memory space exists in the memory 23 before reading of all sheets is completed (YES in s240), image data groups including all image data accumulated in the memory 23 are converted into a single file, and the single file is supplied to the server 3 (see FIG. 6B). The operation mode comprising the processing procedures s120, s130, s240, and s310 to s340 corresponds to the second operation mode.

Conversely, if the memory 23 has does not contain sufficient remaining memory space before completion of reading of all sheets, a NO determination will be provided in s240 and processing according to s120, s130, s240, and s310 will be repeated.

When a NO determination occurs in s240, the operation mode flag is set (the flag will be set to one) (s250), whereby the first operation mode is selected as an operation mode.

Subsequently, image information pertaining to the image data groups is stored in the memory 23 (s160). After the image data groups have been supplied to the server 3 (s170), the multifunction machine 2 checks whether or not reading of all sheets has finished (s180).

When reading of all sheets is determined not to have finished (NO in s180), processing returns to s120, and processing according to s120 and subsequent steps are repeated for the remaining sheets. When sufficient remaining memory space does not exist before reading of all sheets is completed (NO in s240), image data groups are supplied in s170 and deleted from the memory 23, and the processing returns to s120 so that remaining memory space in the memory 23 is assured.

Therefore, sufficient memory space is determined to exist in the memory 23 during processing pertaining to s240 that is performed during the repetition of processing pertaining to s120 and subsequent steps (YES in s240). Subsequently, during a period in which sufficient remaining memory space exists in the memory 23, image data obtained by reading an image recorded on a sheet are sequentially accumulated in the memory 23 until reading of all sheets is completed (NO in s310) (s130).

Once the memory 23 no longer contains sufficient remaining memory space, processing pertaining to s120, s130, s240, and s310 is repeated and image data groups are generated. The image data groups are sequentially supplied to the server (s170) every time the memory 23 no longer contains sufficient memory space (NO in s240) (see "Send_Date" in FIG. 6A).

Once the memory 23 no longer contains sufficient remaining memory space (NO in s240), due to the processing according to s250, the first operation mode in which image data groups are sequentially supplied to the server 3 every time portions of a plurality of sheets are read is selected. The operation mode flag still remains set after the first operation mode has been selected, and the second operation mode is not selected.

When reading of all sheets is determined to have finished in s180 (YES in s180), processing proceeds to s190. After the joint information has been supplied to the server 3 (s190), second scan processing ends. The joint information acquired in this case is for joining the image data groups supplied to the server 3 in s170.

When reading of all sheets is completed during repetition of processing pertaining to s120, s130, s240, and s310 (YES in s310), processing proceeds to s320, where it is checked whether or not the first operation mode is selected (s320).

By means of processing described so far, the operation mode flag is cleared in s100, and the second operation mode is selected. Subsequently, after the memory 23 has become empty of sufficient remaining memory space at least once, reading of all sheets is completed. NO is thereby determined in s240, whereupon processing proceeds to s250. The operation mode flag is set (the flag is set to one), i.e. the first operation mode is selected.

The first operation mode is consequently determined to be selected in s320 (YES in s320), whereby processing proceeds to s190 after storing image information in the memory 23 (s360) and supplying the image data groups to the server 3 (s370). After the joint information has been supplied to the server 3 (s190), second scan processing ends. Joint information acquired in this case is for joining the image data groups supplied to the server 3 in s170 and s370.

(4) Operation and Advantages

Figure 2:
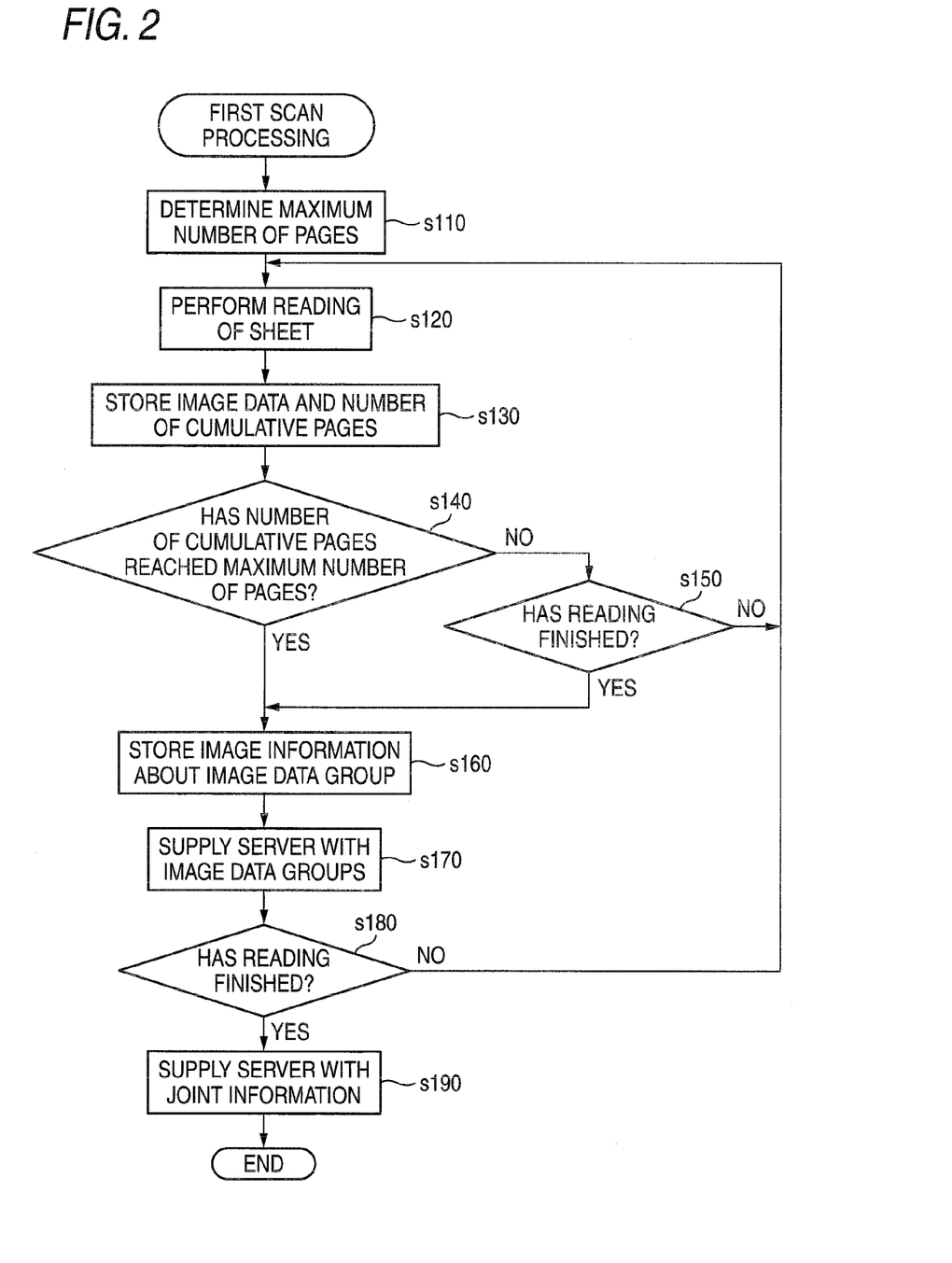
FIG. 2 is a flowchart showing a first scan processing.

The multifunction machine 2 of the aforementioned data supply system 1 sequentially supplies image data groups including one set of image data or more corresponding to one sheet or more (s120 to s180 shown in FIGS. 2 and 5) and also supplies joint information for joining two image data groups or more together (s190 in FIGS. 2 and 5).

Even when the memory 23 of the multifunction machine 2 no longer contains sufficient memory space, image data groups whose data volume is commensurate with actual memory space are sequentially supplied to the server 3. Subsequently, two image data groups or more can be joined as a file by means of the joint information. Hence, even when the number of sheets is large, a single file can eventually be supplied to the server 3.

In the above embodiment, the image data groups can be identified on the basis of the image information included in the joint information. Hence, it is possible to readily identify image data groups to be joined together, thereby generating a joint file.

In the above embodiment, two image data groups or more supplied to the server 3 can be joined together in accordance with an algorithm included in the joint information. Hence, the server 3 (including another terminal unit communicable with the server 3) is caused to perform processing conforming to the algorithm, thereby automatically joining two image data groups or more as a single file.

In the embodiment, every time the volume of data in the image data groups has reached a predetermined level (in the embodiment, a data volume equivalent to the maximum number of pages) (YES in s140 shown in FIG. 2), image data groups generated prior to the volume of data reaching the predetermined level can be supplied to the server 3 (s190 in FIG. 2).

In the above embodiment, the number of sets of image data included in the image data groups is determined (s110 in FIG. 2), and an image data group can be supplied to the server 3 every time a determined number of images are read (s140 to s170 in FIG. 2).

In the above embodiment, it is possible to determine the number of sets of image data included in image data groups to be supplied to the server 3, on the basis of a volume of data expected from parameters, such as a sheet size, the number of sets of color data, and a resolution that are employed during reading of an image (s110 in FIG. 2 and FIG. 3).

In the above embodiment, it is possible to selectively perform operation in any one of the first operation mode and the second operation mode during second scan processing. It is possible to supply image data groups (s170 and s370 in FIG. 5) or a file (s340 in FIG. 5) by means of the selected operation mode.

(5) Example Modification

Although the exemplary embodiments of the present invention have been described above, the present invention is not limited to any of the above embodiments and can assume various forms, so long as the embodiments fall within the technical scope of the present invention.

For instance, in the above embodiment, the maximum number of pages is determined by means of first scan processing (FIG. 2) pertaining to s110 while a presumed volume of data is taken as a reference. However, on occasions when the maximum number of pages is determined, the maximum number of pages may also be determined not from the presumed volume of data but from the volume of image data generated by actually performing reading operation through use of the scan engine 29.

As is evident from the foregoing descriptions, the multifunction machine 2 is equivalent to a scanner, and the sever 3 may correspond to an external device.

The scan engine 29 of the multifunction machine 2 may corresponds to a reading section, and the microcomputer 21 that performs scan processing may correspond to an image data group supply section, a joint information generation section, a joint information supply section, a number determination section, a joined file generation section, a joined file supply section, a determination section, and a selection section.

Processing pertaining to s120 in scan processing may correspond to processing performed by a reading section. Processing pertaining to s170 in scan processing may correspond to processing performed by an image data group supply section.

Processing pertaining to s190 in scan processing may correspond to processing performed by a joint information generation section and a joint information supply section. Processing pertaining to s110 corresponds to processing performed by the number determinations section. Processing pertaining to s330 may correspond to processing performed by a joined file generation section, and processing pertaining to s340 may corresponds to processing performed by a joined file supply section. Processing pertaining to s240 may correspond to processing performed by a determination section, and processing pertaining to s100 and s250 may correspond to processing performed by the selection section.

The microcomputer 31 in the server 3 that joins files (FIG. 4A) may correspond to a joint section.

In addition to being implemented in the form of a scanner and a reading system, embodiments of the present invention can also be implemented in various forms, such as a method for controlling a scanner, a computer program for controlling the scanner, a recording medium (e.g. optical disk) for recording the computer program, and the like.

What is claimed is:

1. A scanner configured to be connected to an external device through a network, and configured to operate in a first operation mode and a second operation mode, the scanner comprising:
   a reading section configured to read an image recorded on a sheet so as to generate image data; and
   a first controller configured to:
   if the first operation mode is selected,
      sequentially generate, in a case where a plurality of images recorded on a plurality of sheets are read by the reading section, an image data group every time n (n>=1) number of sheet among the plurality of sheets is read by the reading section, and sequentially supplies the generated image data group to the external device, each image data group including n number of image data corresponding to the n number of sheet, and n number of sheet being a part of the plurality of sheets;
      generate joint information used to join two or more of the image data groups, the two or more of the image data groups representing the plurality of images; and
      supply the joint information to the external device, and
   if a second operation mode is selected,
      join the plurality of image data corresponding, to the plurality of sheets after reading the plurality of sheets, so as to generate a joined file, in a case where a plurality of images recorded on a plurality of sheets are read by the reading section; and
      supply the joined file to the external device.

2. The scanner according to claim 1,
wherein the joint information includes information for specifying the two or more image data groups.

3. The scanner according to claim 1,
wherein the joint information includes an algorithm for joining the two or more image data groups so as to generate a joined file.

4. The scanner according to claim 1,
wherein the first controller is further configured to:
prepare the image data group in such a way that a data volume of the image data group does not exceed a predetermined volume.

5. The scanner according to claim 1,
wherein the first controller is further configured to:
   determine the number n, and
   supply the image data group to the external device every time the n number of image data generated by the reading section are read by the reading section.

6. The scanner according to claim 5, further comprising:
a storage section that is configured to store the image data generated by the reading section,
wherein the first controller is further configured to:
   delete specific image data stored in the storage section after generating the image data group including the specific image data.

7. The scanner according to claim 5,
wherein the first controller is further configured to:
determine the number n based on the data volume of image data.

8. The scanner according to claim 5,
wherein the first controller is further configured to:
determine the number n based on the number of color data constituting the image data.

9. The scanner according to claim 1
wherein the first controller is further configured to:
sequentially accumulate the image data which are generated when the reading section sequentially reads each of the plurality of sheets, and determine whether or not a total volume of sequentially-accumulated image data exceeds a predetermined volume, and
select the first operation mode if the total volume of image data exceeds the predetermined volume, and select the second operation mode if the total volume of image data does not exceed the predetermined volume.

10. A reading system comprising:
the scanner defined in claim 1; and
the external device,
wherein the external device has a second controller configured to:
join the two or more image data groups supplied from the scanner using the joint information supplied from the scanner.

11. A non-transitory computer readable recording medium storing a computer program for causing a scanner which has, a reading section configured to read an image recorded on a sheet so as to generate image data, and which is connected to an external device through a network, and which is configured to operate in a first operation mode and a second operation mode, to perform processing, the computer program causes the scanner to perform:
if the first operation mode is selected,
sequentially generating, in a case where a plurality of images recorded on a plurality of sheets are read by the reading section, an image data group every time n (n>=1) number of sheet among the plurality of sheets is read by the reading section, and sequentially supplying the generated image data group to the external device, each image data group including n number of image data corresponding to the n number of sheet, and n number of sheet being a part of the plurality of sheets; and
generating joint information used to join two or more of the image data groups, the two or more of the image data groups representing the plurality of images;
supplying the joint information to the external device, and
if the second operation mode is selected,
joining the plurality of image data corresponding to the plurality of sheets after reading the plurality of sheets, so as to generate a joined file, in a case where a plurality of images recorded on a plurality of sheets are read by the reading section; and
supplying the joined file to the external device.

12. A method for controlling a scanner which has, a reading section configured to read an image recorded on a sheet so as to generate image data, which is configured to be connected to an external device through a network, and which is configured to operate in a first operation mode and a second operation mode, the method comprising;
if the first operation mode is selected,
sequentially generating, in a case where a plurality of images recorded on a plurality of sheets are read by the reading section, an image data group every time n (n>=1) number of sheet among the plurality of sheets is read by the reading section, and sequentially supplying the generated image data group to the external device, each image data group including n number of image data corresponding to the n number of sheet, and n number of sheet being a part of the plurality of sheets;
generating joint information used to join two or more of the image data groups, the two or more of the image data groups representing the plurality of images; and
supplying the joint information to the external device, and
if the second operation mode is selected,
joining the plurality of image data corresponding to the plurality of sheets after reading the plurality of sheets, so as to generate a joined file, in a case where a plurality of images recorded on a plurality of sheets are read by the reading section; and
supplying the joined file to the external device.

* * * * *